United States Patent
Ye

(10) Patent No.: US 12,452,163 B2
(45) Date of Patent: Oct. 21, 2025

(54) ROUTE NOTIFYING METHODS AND ELECTRONIC DEVICES

(71) Applicant: New H3C Technologies Co., Ltd., Zhejiang (CN)

(72) Inventor: Jinrong Ye, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 48 days.

(21) Appl. No.: 18/002,645

(22) PCT Filed: Jun. 25, 2021

(86) PCT No.: PCT/CN2021/102541
§ 371 (c)(1),
(2) Date: Dec. 20, 2022

(87) PCT Pub. No.: WO2022/267057
PCT Pub. Date: Dec. 29, 2022

(65) Prior Publication Data
US 2024/0121175 A1   Apr. 11, 2024

(51) Int. Cl.
*H04L 45/16* (2022.01)
*H04L 45/02* (2022.01)
*H04L 45/745* (2022.01)

(52) U.S. Cl.
CPC ............ *H04L 45/16* (2013.01); *H04L 45/02* (2013.01); *H04L 45/04* (2013.01); *H04L 45/745* (2013.01)

(58) Field of Classification Search
None
See application file for complete search history.

(56) References Cited

U.S. PATENT DOCUMENTS

| 10,917,330 | B1 | 2/2021 | Szarecki et al. |
| 12,206,577 | B2 * | 1/2025 | Zhang .................. H04L 45/566 |
| 2018/0131532 | A1 | 5/2018 | Wijnands et al. |

(Continued)

FOREIGN PATENT DOCUMENTS

| CN | 103944822 A | 7/2014 |
| CN | 106603406 A | 4/2017 |

(Continued)

OTHER PUBLICATIONS

ISA State Intellectual Property Office of the People's Republic of China, Written Opinion of the International Searching Authority Issued in Application No. PCT/CN2021/102541, Feb. 10, 2022, WIPO, 7 pages.

(Continued)

*Primary Examiner* — Xavier S Wong
(74) *Attorney, Agent, or Firm* — McCoy Russell LLP

(57) ABSTRACT

The present disclosure provides route notifying methods and electronic devices. In this embodiment, respective ASBRs connected with a second AS in a first AS notify network reachability information (carrying a BIER Path Attribute, where the BIER Path Attribute at least includes BFR IDs of respective BFRs in the first AS) corresponding to a same BFR group prefix to the second AS; when receiving the network reachability information notified by the ASBR in the first AS, the ASBR in the second AS continues to notify a BIER route of the same BFR group prefix in the first AS in the second AS (carrying the BFR IDs of respective BFRs in the first AS).

20 Claims, 7 Drawing Sheets

(56) References Cited

U.S. PATENT DOCUMENTS

| | | | |
|---|---|---|---|
| 2018/0278521 A1* | 9/2018 | Pfister | H04L 69/22 |
| 2019/0097944 A1 | 3/2019 | Kotalwar et al. | |
| 2020/0007358 A1* | 1/2020 | Bidgoli | H04L 12/2861 |
| 2020/0344162 A1* | 10/2020 | Dutta | H04L 47/825 |
| 2021/0058260 A1 | 2/2021 | Xia et al. | |

FOREIGN PATENT DOCUMENTS

| | | |
|---|---|---|
| CN | 110460522 A | 11/2019 |
| CN | 110784411 A | 2/2020 |
| CN | 112511444 A | 3/2021 |
| EP | 3783849 A1 | 2/2021 |
| WO | 2021063232 A1 | 4/2021 |

OTHER PUBLICATIONS

European Patent Office, Extended European Search Report Issued in Application No. 21945381.8, Sep. 5, 2023, Germany, 5 pages.

Wijnands, I. et al., "Multicast Using Bit Index Explicit Replication (BIER)," Internet Engineering Task Force (IETF) Website, Request for Comments: 8279, Available Online at https://datatracker.ietf.org/doc/html/rfc8279, Nov. 2017, ISSN: 2070-1721, 43 pages.

State Intellectual Property Office of the People's Republic of China, Office Action and Search Report Issued in Application No. 202180001672.2, Oct. 22, 2024, 9 pages. (Submitted with Machine Translation).

ISA State Intellectual Property Office of the People's Republic of China, International Search Report Issued in Application No. PCT/CN2021/102541, Feb. 10, 2022, WIPO, 4 pages.

\* cited by examiner

ROUTE NOTIFYING METHODS AND ELECTRONIC DEVICES

CROSS REFERENCE TO RELATED APPLICATION

The present application is a U.S. national phase of International Application No. PCT/CN2021/102541 filed on Jun. 25, 2021, the disclosure of which is hereby incorporated by reference in its entirety for all purposes.

TECHNICAL FIELD

The present disclosure relates to the field of network communication technologies, and in particular to route notifying methods and electronic devices.

BACKGROUND

Bit Index Explicit Replication (BIER) is a new type of multi-cast technology. A router supporting BIER capability is referred to as Bit-Forwarding Router (BFR), and a domain including BFRs is called BIER domain for short. The BFRs in the BIER domain may be further divided into Bit-Forwarding Ingress Router (BFIR), Bit-Forwarding Egress Router (BFER), and intermediate BFR between the BFIR and the BFER. A multi-cast packet enters the BIER domain from a BFIR, then is transmitted to at least one BFER via an intermediate BFR and then leaves the BIER domain from the at least one BFER.

SUMMARY

The present disclosure provides route notifying methods and electronic devices to realize IPv6-based BIER route notifying.

As an embodiment, the present disclosure is realized by employing the following technical solution.

Provided is a route notifying method, applied to a first border router (ASBR) in a first autonomous system (AS), where the first ASBR and at least one other ASBR in the first AS are connected with a second AS, the first ASBR and the at least one other ASBR are members of a first BFR group, the first ASBR and the at least one other ASBR are configured with a first BFR group prefix in a specified sub-domain (SD), and the first BFR group prefix represents the first BFR group. The method includes:

collecting BFR identifiers (IDs) of respective BFRs in the first AS;

notifying a route UPDATE message to the second AS, where the UPDATE message carries network layer reachability information (NLRI) and a first Bit Index Explicit Replication (BIER) Path Attribute; the NLRI at least includes the first BFR group prefix; the BIER Path Attribute at least includes the collected BFR IDs and a first BFR prefix representing the first ASBR such that at least one ASBR receiving the UPDATE message in the second AS adds a corresponding Bit Index Forwarding Table (BIFT) forwarding entry in a BIFT and notifies a BIER route corresponding to the first BFR group prefix in the second AS; the BIFT forwarding entry at least includes: a BFR neighbor and a forwarding bit mask (F-BM), where the BFR neighbor is indicated by the first BFR prefix, the F-BM represents BFR IDs corresponding to respective BFRs reachable via the BFR neighbor, and the BFR IDs represented by the F-BM at least include the BFR IDs collected by the first ASBR in the first AS.

Provided is a route notifying method, applied to a second border router (ASBR) in a second autonomous system (AS), where the second ASBR is connected with a first ASBR in a first AS, at least one other ASBR than the second ASBR in the second AS is also connected with the first AS, the second ASBR and the at least one other ASBR are members of a second Bit Forwarding Router (BFR) group, the second ASBR and the at least one other ASBR are configured with a second BFR group prefix in a specified sub-domain (SD), and the second BFR group prefix represents the second BFR group. The method includes:

receiving a route UPDATE message notified by the first ASBR in the first AS, where the UPDATE message at least carries network layer reachability information (NLRI) and a newly-added Bit Index Explicit Replication (BIER) Path Attribute, the NLRI is a first BFR group prefix, members in a first BFR group corresponding to the first BFR group prefix include the first ASBR and at least one other ASBR connected with the second AS in the first AS;

adding a corresponding Bit Index Forwarding Table (BIFT) forwarding entry in a BIFT, where the BIFT forwarding entry at least includes: a BFR neighbor and a forwarding bit mask (F-BM), the BFR neighbor is indicated by the first BFR prefix, the F-BM represents BFR IDs corresponding to respective BFRs reachable via the BFR neighbor, and the BFR IDs represented by the F-BM at least include the BFR IDs collected by the first ASBR in the first AS and carried in the BIER Path Attribute;

notifying a BIER route corresponding to the first BFR group prefix in the second AS, such that the BFR in the second AS selects one of a plurality of BIER routes corresponding to the first BFR group prefix as an optimal route based on a route optimization method when receiving the plurality of BIER routes corresponding to the first BFR group prefix.

Provided is an electronic device, including a processor and a machine readable storage medium; where, the machine readable storage medium stores machine executable instructions executable by the processor;

the processor is configured to execute the machine executable instructions to implement the steps of any one of the above methods.

In the above technical solution of the present disclosure, respective ASBRs connected with the second AS in the first AS notify the network reachability information (carrying the BIER Path Attribute, where the BIER Path Attribute at least includes BFR IDs of respective BFRs in the first AS) corresponding to the same BFR group prefix to the second AS; when receiving the network reachability information notified by the ASBR in the first AS, the ASBR in the second AS continues to notify the BIER route of the same BFR group prefix in the first AS in the second AS (carrying the BFR IDs of respective BFRs in the first AS), such that a device in the second AS receives a plurality of routes of the same prefix of the first AS and selects one of the plurality of routes as an optimal route based on a route optimization method, thereby reducing BIER route calculation complexity and ensuring subsequent packet forwarding.

DETAILED DESCRIPTION OF THE EMBODIMENTS

Figure 1:
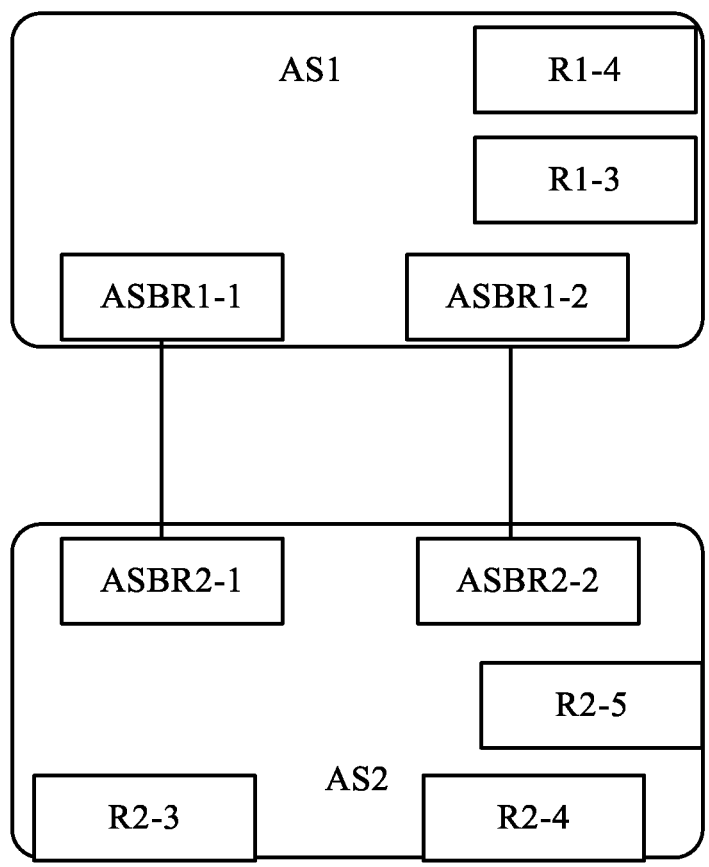
FIG. 1 is a diagram of a network in an across-AS BIER scenario according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

The terms used in the present disclosure are used only for the purpose of describing the specific embodiments rather than limiting the present disclosure. "A", "the" and "said" in the singular form used in the present disclosure and the appended claims are also intended to include plural unless otherwise clearly indicated in the context.

In order to help those skilled in the art to understand the technical solutions of the embodiments of the present disclosure better and make the above objects, characteristics and advantages of the embodiments of the present disclosure clearer, technical terms relating to the embodiments of the present disclosure are described below.

Sub-domain (SD), which refers to a BIER sub-domain. One BIER domain includes at least one BIER sub-domain. In the BIER domain, for each BIER sub-domain, a BFR identifier (ID) is configured for a specified BFR in the BIER sub-domain. Optionally, the specified BFR may be BFIR, BFER and the like, which is not limited herein.

BFR-Prefix, which represents a BFR, different BFRs in a same SD being represented by different BFR prefixes. In a specific implementation, the BFR prefix indicating a BFR may be denoted as one IPv4 address or IPv6 address of the BFR. In this embodiment, the IPv6 address is taken as an example of the BFR prefix.

BIER encapsulation type, which represents a BIER encapsulation type supported by the BFR, for example, an MPLS type, an Ethernet type, an IPv6 type (denoted as BIER6) and the like.

Bit String Length (BSL), which represents a length of a bit string in a BIER encapsulation.

MAX Set Identifier (SI), which represents a maximum number of SIs. SI represents an ID of a set to which a bit string in the BIER encapsulation belongs. When a range of the BFR ID exceeds a range of the BSL, a plurality of sets are required for representation, where each set has one unique ID. For example, when the range of the BFR ID is 1-512 and the BSL is 256, two sets are required for representation. SI=0 represents 1-256 and SI=1 represents 257-512.

Under a precondition of deploying a BIER on an AS (an AS on which a BIER is deployed is denoted as AS BIER), there are usually two or more pairs of Autonomous System Border Routers (ASBR) connected between two ASs in an across-AS BIER scenario. As shown in FIG. 1, there are two pairs of ASBRs connected between AS1 and AS2, that is, ASBR1-1 in the AS1 is connected with ASBR2-1 in the AS2, and ASBR1-2 in the AS1 is connected with ASBR2-2 in the AS2.

Under a precondition that there are at least two pairs of ASBRs connected between two ASs, for any one AS of the two ASs, at least two ASBRs connected with the other AS in the AS may collect BFR IDs of respective BFRs in the present AS, and then carry the collected BFR IDs in network reachability information corresponding to a BFR-Prefix indicating the present device and provide the network reachability information to the other AS. Because different ASBRs in a same AS have different BFR-Prefixes, any one device in the other AS may take different pieces of network reachability information provided by the different ASBRs as mutually-independent unicast routes based on different BFR-Prefixes when receiving the network reachability information provided by the different ASBRs, which may increase BIER route calculation complexity.

Taking AS2 in the network shown in FIG. 1 as an example, ASBR2-1 collects BFR IDs of respective BFRs in the AS2, carries the collected BFR IDs in the network reachability information corresponding to the BFR-Prefix of the ASBR2-1 and then notifies the network reachability information to the AS1. ASBR2-2 performs similar operations. When receiving the network reachability information provided by the ASBR2-1, ASBR1-1 in the AS1 may continue to notify the network reachability information in the AS1. Similarly, when receiving the network reachability information provided by the ASBR2-2, ASBR1-2 in the AS1 may continue to notify the network reachability information in the AS1. Because two pieces of network reachability information provided by the ASBR2-1 and ASBR2-2 correspond to different BFR-Prefixes, any one device in the AS1 may take the network reachability information provided by the ASBR2-1 and the network reachability information provided by the ASBR2-2 as two mutually-independent unicast routes when receiving the two pieces of network reachability information. For example, when receiving the network reachability information corresponding to the BFR-Prefix of the ASBR2-1 and the network reachability information corresponding to the BFR-Prefix of the ASBR2-2, R1-3 in the AS1 may take the two pieces of network reachability information as two mutually-independent unicast routes based on different BFR-Prefixes of the ASBR2-1 and the ASBR2-2.

In fact, although the BFR-Prefix of the ASBR2-1 and the BFR-Prefix of the ASBR2-2 are different, because the network reachability information corresponding to the BFR-Prefix of the ASBR2-1 and the network reachability information corresponding to the BFR-Prefix of the ASBR2-2 both carry the same BFR ID (i.e. the BFR ID of each BFR in the AS2), the two pieces of network reachability information shall not be considered as mutually-independent unicast routes. In the prior art, when there are at least two pairs of ASBRs connected between two AS s, a BFR in any one AS takes network reachability information corresponding to different BFR-Prefixes provided by respective ASBRs from a same external AS as independent unicast routes, which may increase BIER route calculation complexity, for example, route optimization based on BFR ID and the like, and affect subsequent packet forwarding.

Figure 2:
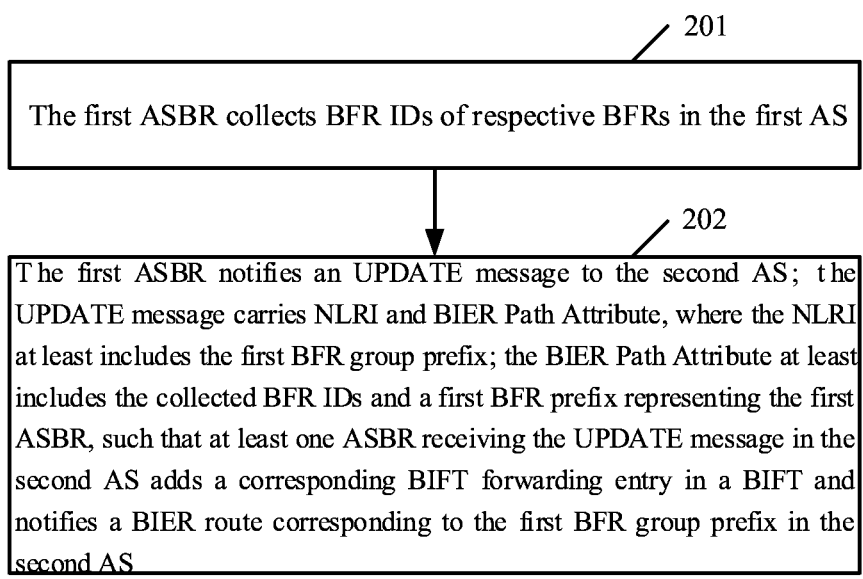
FIG. 2 is a flowchart of a method according to an embodiment of the present disclosure.

In order to solve the above technical problem, an embodiment of the present disclosure provides a method flow shown in FIG. 2.

FIG. 2 is a flowchart of a method according to an embodiment of the present disclosure. The method is applied to a first ASBR in a first AS. In this embodiment, the first ASBR and at least one other ASBR in the first AS both are connected with a second AS. It is noted that the first AS, the first ASBR and the second AS are named for ease of descriptions rather than for limitation.

In this embodiment, the first ASBR and at least one other ASBR connected with the second AS in the first AS are members of a BFR group. The BFR group herein may also be referred to as a virtual BFR node. The following descriptions are made with the BFR group as an example.

Optionally, as an embodiment, the ASBRs connected with a same external AS in a same AS may be abstracted as one BFR group. In this embodiment, still taking the network shown in FIG. 1 as an example, the ASBR1-1 and the ASBR1-2 both connected with the AS2 in the AS1 may be abstracted as one BFR group (denoted as BFR group 1), and the ASBR2-1 and the ASBR2-2 connected with the AS1 in the AS2 may be abstracted as another BFR group (denoted as BFR group 2) and the like.

Optionally, as an embodiment, all ASBRs connected with respective external ASs in a same AS may also be abstracted as one BFR group. In this embodiment, still taking the AS1 in the network shown in FIG. 1 as an example, the ASBR1-1 and the ASBR1-2 connected with the AS2 in the AS1, and R1-3 and R1-4 connected with an AS3 (not shown) may be abstracted as one BFR group (denoted as BFR group 1).

Optionally, in this embodiment, all BFRs with BFR IDs being non-zero in a same AS may be abstracted as one BFR group. Taking the AS2 in the network shown in FIG. 1 as an example, the BFR IDs of the ASBR2-1, the ASBR2-2, R2-3, R2-4 and R2-5 in the AS2 are not zero, and thus the ASBR2-1, the ASBR2-2, the R2-3, the R2-4 and the R2-5 may be abstracted as one BFR group. It is noted that in an embodiment, the BFR ID of a BFR which is deployed as BFIR or BFER is usually not zero.

In this embodiment, the members in each BFR group are all configured with a same BFR group prefix in a same SD. Optionally, the SD herein may be an SD in which all members of the BFR group are located, or an SD to which a route to be subsequently notified belongs or the like, which is not limited herein.

Optionally, the BFR group prefix represents the BFR group. Different BFR groups are represented by different BFR group prefixes. In a specific implementation, the BFR group prefix may be a specified prefix identifier. For example, in an application to IPv6 network, the BFR group prefix may be an IPv6 address or the like, which is not limited herein in this embodiment.

Based on the above descriptions, in this embodiment, the first ASBR and at least one other ASBR connected with the second AS in the first AS are configured with a same BFR group prefix in a same specified SD (denoted as a first BFR group prefix). The specified SD may be an SD in which all members of the BFR group are located, or an SD to which a route to be subsequently notified belongs or the like. The first BFR group prefix represents a first BFR group. For example, in an IPv6 network, the first BFR group prefix may be an IPv6 address or the like. It is noted that the first BFR group prefix is named only for ease of descriptions rather than for limitation.

Based on the above descriptions, as shown in FIG. 2, the flow may include the following steps.

At step 201, the first ASBR collects BFR IDs of respective BFRs in the first AS.

As an embodiment, the BFR IDs collected by the first ASBR may include a BFR ID of a BFR deployed as BFIR in the first AS and a BFR ID of a BFR deployed as BFER in the first AS.

Optionally, an Interior Gateway Protocol (IGP) module or a BIER route management module running on the first ASBR may collect BFR IDs of respective BFRs in the present AS based on the IGP. When the step 201 is performed, the first ASBR may collect the BFR IDs of respective BFRs in the first AS from the IGP module or the BIER route management module, for example, the BFR ID of the BFR deployed as BFIR in the first AS and the BFR ID of the BFR deployed as BFER in the first AS.

At step 202, the first ASBR notifies an UPDATE message to the second AS. The UPDATE message at least carries network layer reachability information (NLRI) and BIER Path Attribute, where the NLRI at least includes the first BFR group prefix; the BIER Path Attribute at least includes the collected BFR IDs and a first BFR prefix representing the first ASBR, such that at least one ASBR receiving the UPDATE message in the second AS adds a corresponding BIFT forwarding entry in a BIFT and notifies a BIER route corresponding to the first BFR group prefix in the second AS.

Figure 3:
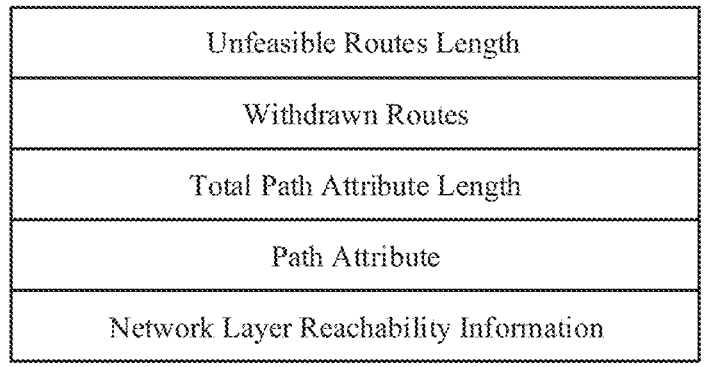
FIG. 3 is a diagram of a format of an EBGP UPDATE message according to an embodiment of the present disclosure.

As mentioned in the step 202, the first ASBR notifies network reachability information corresponding to a first BFR group prefix of the first BFR group where the first ASBR is located through the UPDATE message. Optionally, the UPDATE message in the embodiment may be obtained by making an extension to an External Border Gateway Protocol (EBGP), specifically, newly obtaining an EBGP UPDATE message of a Path Attribute by an extension. The newly-obtained Path Attribute herein is the BIER Path Attribute. In this embodiment, the BIER Path Attribute may be taken as a Path Attribute newly added in the EBGP UPDATE message, and the specific position of the Path Attribute newly added in the EBGP UPDATE message is not limited herein. FIG. 3 exemplifies an existing format of an EBGP UPDATE message, and the BIER Path Attribute in the embodiment may be a Path Attribute newly added to the Path Attributes shown in FIG. 3. In this embodiment, the BIER Path Attribute may be in the format of TLV (Type-Length-Value), which will be described by way of examples below.

In this embodiment, the UPDATE message carries the NLRI as well as the BIER Path Attribute. As an embodiment, the NLRI at least includes the first BFR group prefix of the first BFR group and a length of the first BFR group prefix. For example, the NLRI at least includes 2002:2:2F:: 200/128. It can be seen from the step 202 and the NLRI that in this embodiment, the members in any one BFR group may provide network reachability information corresponding to the same BFR group prefix, i.e. corresponding to the BFR group prefix of the BFR group to which the members belong. Subsequently, when receiving different pieces of the network reachability information corresponding to the same BFR group prefix provided by different members in the BFR group, the BFR in another AS may no longer take the different pieces of the network reachability information as mutually-independent different unicast routes based on the same BFR group prefix, nor perform route calculation separately and independently, which will be detailed below.

It is noted that in this embodiment, the first BFR prefix carried in the BIER Path Attribute is a prefix which is configured for the first ASBR in an SD (for example, in the specified SD or the like) to represent the first ASBR, and the prefix may be an IPv6 address of the first ASBR. The first BFR prefix herein represents the first ASBR, which is different from the first BFR group prefix.

As mentioned in the step 202, when the first ASBR notifies an UPDATE message to the second AS, the second ASBR receiving the UPDATE message in the second AS adds a corresponding BIFT forwarding entry in a BIFT and notifies a BIER route corresponding to the first BFR group prefix in the second AS.

Optionally, the BIFT forwarding entry at least includes: a BFR neighbor (BFR-NBR) and a forwarding bit mask (F-BM), where the BFR neighbor is indicated by the first BFR prefix, the F-BM at least represents BFR IDs corresponding to respective BFRs reachable via the BFR neighbor, and the BFR IDs represented by the F-BM at least include the BFR IDs collected by the first ASBR in the first AS.

Optionally, in this embodiment, the BFR ID may be represented by a bit mask of an SI combination corresponding to the BFR ID. For example, in the F-BM, bits corresponding to the BFR IDs corresponding to respective BFRs reachable via the BFR neighbor are set to a first value, for example, 1, and the remaining bits are set to a second value, for example, 0. In the F-BM, that a bit is set to the first value (for example, 1), indicates that the BFR corresponding to the BFR ID represented by the bit can be reached via the BFR neighbor. When the bit is set to 0, it indicates that the BFR corresponding to the BFR ID represented by the bit cannot be reached via the BFR neighbor. Detailed descriptions for the above will be made below.

In this embodiment, the second ASBR may firstly modify the BIER Path Attribute when notifying the BIER route corresponding to the first BFR group prefix in the second AS, which includes: modifying the first BFR prefix in the BIER Path Attribute into a second BFR prefix representing the second ASBR, and then notifying the network reachability information corresponding to the first BFR group prefix (carrying the NLRI and the modified BIER Path Attribute, where the network reachability information may be called BIER route for short at this time) in the second AS.

As can be seen from the flow shown in FIG. 2, in this embodiment, when there are at least two pairs of ASBRs connected between the first AS and the second AS, different pieces of NLRI of route UPDATE messages notified by respective ASBRs connected with the second AS in the first AS are same (all include a same BFR group prefix). In this way, when receiving a plurality of routes of the same BFR group prefix of the first AS, respective BFRs in the second AS may no longer take the plurality of routes as independent routes for calculation, but select one of the plurality of routes as an optimal route based on a route optimization method. In this way, compared with the prior art in which the plurality of routes are taken as independent routes for calculation, the BIER route calculation complexity is obviously reduced and subsequent packet forwarding is also guaranteed.

For example, in FIG. 1, the ASBR2-1 and the ASBR2-2 in the AS2 provide the network reachability information corresponding to the same BFR group prefix (denoted as Group BFR-Prefix2). When receiving the network reachability information corresponding to the first BFR group prefix provided by the ASBR2-1, the ASBR1-1 in the AS1 may continue to notify the network reachability information corresponding to the first BFR group prefix in the AS1. Likewise, when receiving the network reachability information corresponding to the first BFR group prefix provided by the ASBR2-2, the ASBR1-2 in the AS1 may also continue to notify the network reachability information corresponding to the first BFR group prefix in the AS1. In this case, a device, for example, the R1-3 and the like in the AS1 may receive two routes of same BFR group prefix in the AS2. When receiving the two routes of same BFR group prefix in the AS2, the device, for example, the R1-3 and the like in the AS1 may no longer take the two routes as mutually-independent unicast routes nor perform route calculation independently, but select one route therefrom as an optimal route based on a route optimization method. In this way, the BIER route calculation complexity is significantly reduced and the subsequent packet forwarding is guaranteed.

The BIER Path Attribute is described below.

Figure 4:
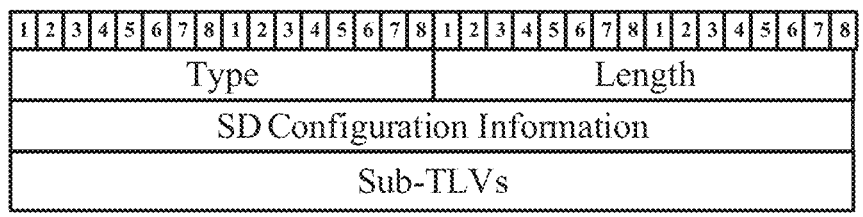
FIG. 4 is a structure diagram of a BGP BIER Path Attribute field according to an embodiment of the present disclosure.

As mentioned above, the BIER Path Attribute may be one TLV structure. FIG. 4 exemplifies a structure of a BIER Path Attribute. Preferably, Sub-TLVs fields in the structure of the BIER Path Attribute shown in FIG. 4 carry the following three newly-added sub-sub-TVLs which are denoted as a first TLV, a second TLV and a third TLV respectively.

1) The First TLV

Figure 5:
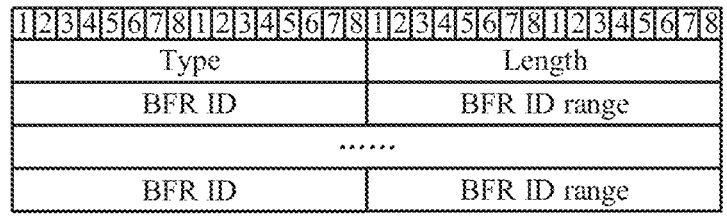
FIG. 5 is a structure diagram of a BFR ID Range field according to an embodiment of the present disclosure.

In this embodiment, the first TLV is used to carry the BFR IDs collected by the first ASBR in the first AS. Optionally, as shown in FIG. 5, the first TLV at least includes at least one field pair. Each field pair includes a BFR ID field and a BFR ID range field which are in corresponding relationship. In this embodiment, the first TLV carries the BFR IDs collected by the first ASBR in the first AS through at least one field pair.

In each field pair, a parameter carried in the BFR ID Range field represents a BFR ID segment with continuous values, and the BFR ID field carries a start BFR ID of the BFR ID segment. It is noted that when the first TLV includes two or more field pairs, the start BFR IDs carried in different BFR ID fields in different field pairs are different. For example, the BFR IDs collected by the first ASBR in the first AS are divided into two parts: one part is 1-251 and the other part is 260-512. In this case, the first TLV may include two field pairs, where one field pair includes BFR ID field 1_1 and BFR ID Range field 1_1; the other field pair includes BFR ID field 1_2 and BFR ID Range field 1_2. The BFR ID field 1_1 carries the start value 1 of the BFR ID segment with continuous values, i.e. 1-251, and the BFR ID Range field 1_1 carries 251 to represent the BFR ID segment with continuous values, i.e. 1-251 (which may represent that there are 251 BFR IDs in the BFR ID segment with continuous values, i.e. 1-251). The BFR ID field 1_2 carries the start value 260 of the BFR ID segment with continuous values, i.e. 260-512, and the BFR ID Range field 1_2 carries 253 to represent the BFR ID segment with continuous values, i.e. 260-512 (which may represent that there are 253 BFR IDs in the BFR ID segment with continuous values, i.e. 260-512).

Optionally, as shown in FIG. 5, in this embodiment, the first TLV further includes a Type field and a Length field. The Type field and the Length field may be set according to actual situations, for example, the length of the Type field is set to 2 bytes, and the length of the Length field is set to 2 bytes and the like, which is not limited herein in this embodiment.

2) The Second TLV

Figure 6:
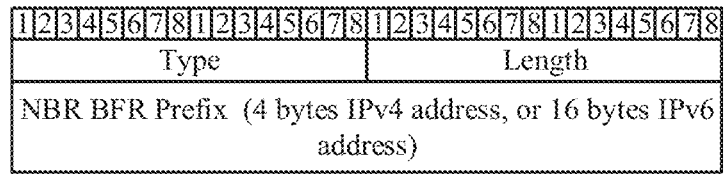
FIG. 6 is a structure diagram of a BFR-Prefix field indicating a BFR neighbor according to an embodiment of the present disclosure.

In this embodiment, the second TLV is used to carry the first BFR prefix. Optionally, as shown in FIG. 6, the second TLV may at least include a BFR-Prefix field. The BFR-Prefix field carries the first BFR prefix to instruct the BFR receiving a BGP UPDATE message subsequently to take the first BFR prefix as a destination address for forwarding the BIER packet to the first ASBR.

Optionally, as shown in FIG. 6, in this embodiment, the second TLV further includes a Type field and a Length field. The Type field and the Length field may be set according to actual situations and thus will not be defined one by one herein.

3) The Third TLV

Figure 7:
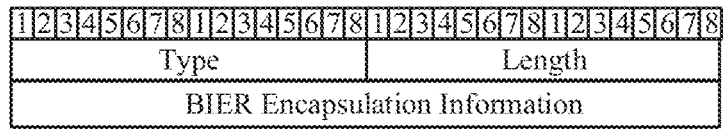
FIG. 7 is a structure diagram of BIER encapsulation information field according to an embodiment of the present disclosure.

In this embodiment, the third TLV indicates BIER encapsulation information supported by the first ASBR. Optionally, as shown in FIG. 7, the third TLV may at least include: a Type field, a Length field, and a BIER encapsulation information field. The Type field is used to carry a BIER encapsulation type supported by the first ASBR, for example, an MPLS encapsulation type, an IPv6-based BIER (denoted as BIER6) and the like. Optionally, the length of the Type field may be set to 2 bytes. The Length field may be set according to actual situations. The Length field represents the length of the BIER encapsulation information field, for example, two bytes. The BIER encapsulation information field is used to carry the BIER encapsulation information supported by the first ASBR. As an embodiment, the BIER encapsulation information may be used to assist the second ASBR in determining an entry identifier of the BIFT forwarding entry. In an example, the BIER encapsulation information may at least include MAX SI, BSL and BIFT ID.

MAX SI represents an SI corresponding to a maximum BFR ID in the first AS where the first ASBR is located. Optionally, the MAX SI may occupy 8 bits.

BSL represents a bit string length in a BIER encapsulation supported by the first ASBR. Optionally, the BSL may occupy 4 bits.

BIFT ID represents an identifier of a local BIFT of the first ASBR.

Optionally, as an embodiment, the BIER Path Attribute further carries an SD configuration field shown in FIG. 4. The SD configuration field carries SD configuration information. AS an embodiment, the SD configuration information at least includes the specified SD and the BFR ID of the first ASBR.

The method according to the embodiments of the present disclosure is described below from the perspective of the second ASBR in the second AS.

Figure 8:
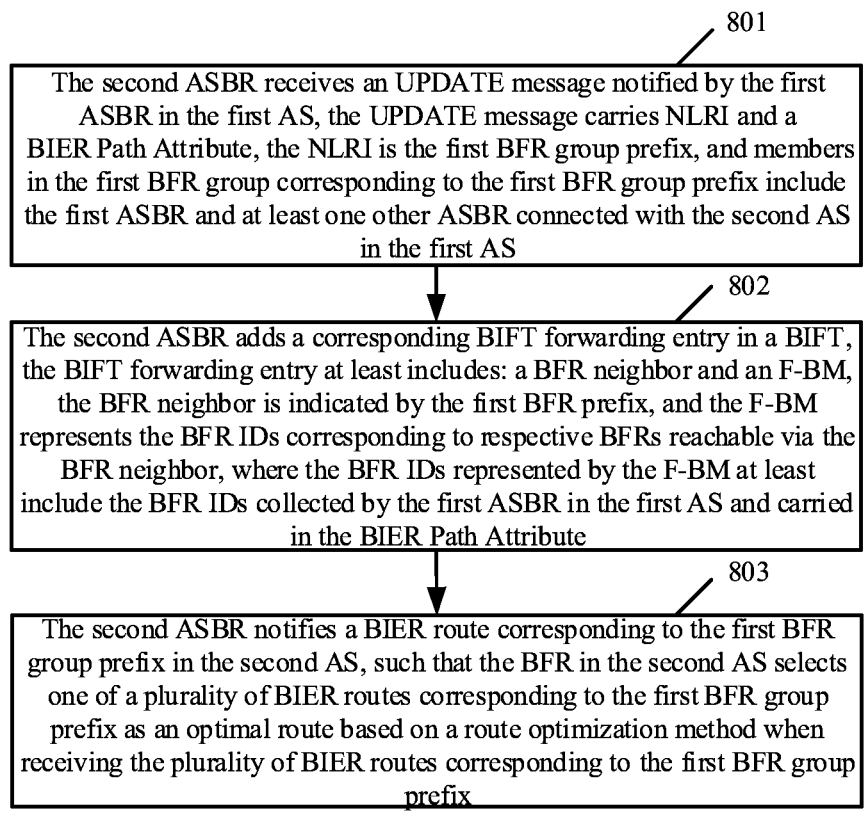
FIG. 8 is another flowchart of an embodiment of the present disclosure.

FIG. 8 is a flowchart of another method according to an embodiment of the present disclosure. As shown in FIG. 8, the flow is applied to the second ASBR in the second AS. The second ASBR is connected with the first ASBR in the first AS. In this embodiment, at least one other ASBR than the second ASBR in the second AS is also connected with the first AS, the second ASBR and the at least one other ASBR are members of a second BFR group, the second ASBR and the at least one other ASBR are configured with a second BFR group prefix in a specified SD, and the second BFR group prefix represents the second BFR group. In this embodiment, the second BFR group prefix may be a specified IPv6 address. It is noted that the specified SD to which the second BFR group prefix belongs is identical to or different from the specified SD to which the first BFR group prefix belongs, which is not limited herein.

As shown in FIG. 8, the flow may include the following steps.

At step 801, the second ASBR receives an UPDATE message notified by the first ASBR in the first AS. The UPDATE message at least carries NLRI and a newly-added BIER Path Attribute, the NLRI at least includes the first BFR group prefix, and members in the first BFR group corresponding to the first BFR group prefix include the first ASBR, and at least one other ASBR connected with the second AS in the first AS.

In this embodiment, the first BFR group prefix is different from the second BFR group prefix. For example, the first BFR group prefix is 2001:1:1A::100/128 and the second BFR group prefix is 2002:2:2F::200/128.

When the second ASBR receives the UPDATE message notified by the first ASBR in the first AS and finds that the UPDATE message carries the BIER Path Attribute, it is considered that the BIER route is received. Afterwards, step 802 is performed.

At step 802, the second ASBR adds a corresponding BIFT forwarding entry in a BIFT. The BIFT forwarding entry at least includes: a BFR neighbor and an F-BM. The BFR neighbor is indicated by the first BFR prefix, and the F-BM represents the BFR IDs corresponding to respective BFRs reachable via the BFR neighbor. The BFR IDs represented by the F-BM at least include the BFR IDs collected by the first ASBR in the first AS and carried in the BIER Path Attribute.

At step 803, the second ASBR notifies a BIER route corresponding to the first BFR group prefix in the second AS, such that the BFR in the second AS selects one of a plurality of BIER routes corresponding to the first BFR group prefix as an optimal route based on a route optimization method when receiving the plurality of BIER routes corresponding to the first BFR group prefix.

According to the flow shown in FIG. 2, respective ASBRs connected with the second AS in the first AS may send UPDATE messages carrying the same NLRI (at least including the first BFR group prefix). According to the flow shown in FIG. 8, the ASBRs connected with the first AS in the second AS may receive the UPDATE messages carrying the same NLRI (at least including the first BFR group prefix) and notify a BIER route corresponding to the first BFR group prefix in the second AS. In addition to the ASBRs connected with the first AS, respective BFRs in the second AS may also notify the BIER route corresponding to the first BFR group prefix in the second AS, and the BFRs in the second AS may finally receive a plurality of routes of the same BFR group prefix (i.e. the first BFR group prefix) from the first AS. Because the plurality of routes correspond to the same BFR group prefix (i.e. the first BFR group prefix) in the first AS, the device in the second AS may no longer take the plurality of routes from the first AS as mutually-independent unicast routes nor perform route calculation independently, but select one of the plurality of routes as an optimal route based on a route optimization method. This significantly reduces BIER route calculation complexity and guarantees subsequent packet forwarding.

Now, the flow shown in FIG. 8 is completed. In this flow shown in FIG. 8, when there are two or more pairs of ASBRs connected between the first AS and the second AS, respective ASBRs connected with the first AS in the second AS may receive the UPDATE messages carrying the same NLRI (at least including the first BFR group prefix) notified by the ASBRs in the first AS. In this case, the ASBRs connected with the first AS in the second AS may notify a BIER route corresponding to the first BFR group prefix carried in the received UPDATE messages in the second AS and the device in the second AS may finally receive a plurality of routes of the same BFR group prefix (i.e. the first BFR group prefix) from the first AS. Because the plurality of routes correspond to the same BFR group prefix (i.e. the first BFR group prefix) in the first AS, the device in the second AS may no longer take the plurality of routes from the first AS as mutually-independent unicast routes nor perform route calculation independently, but select one of the plurality of routes as an optimal route based on a route optimization method. This significantly reduces BIER route calculation complexity and guarantees subsequent packet forwarding.

The present disclosure is exemplified below in combination with a specific embodiment.

Figure 9:
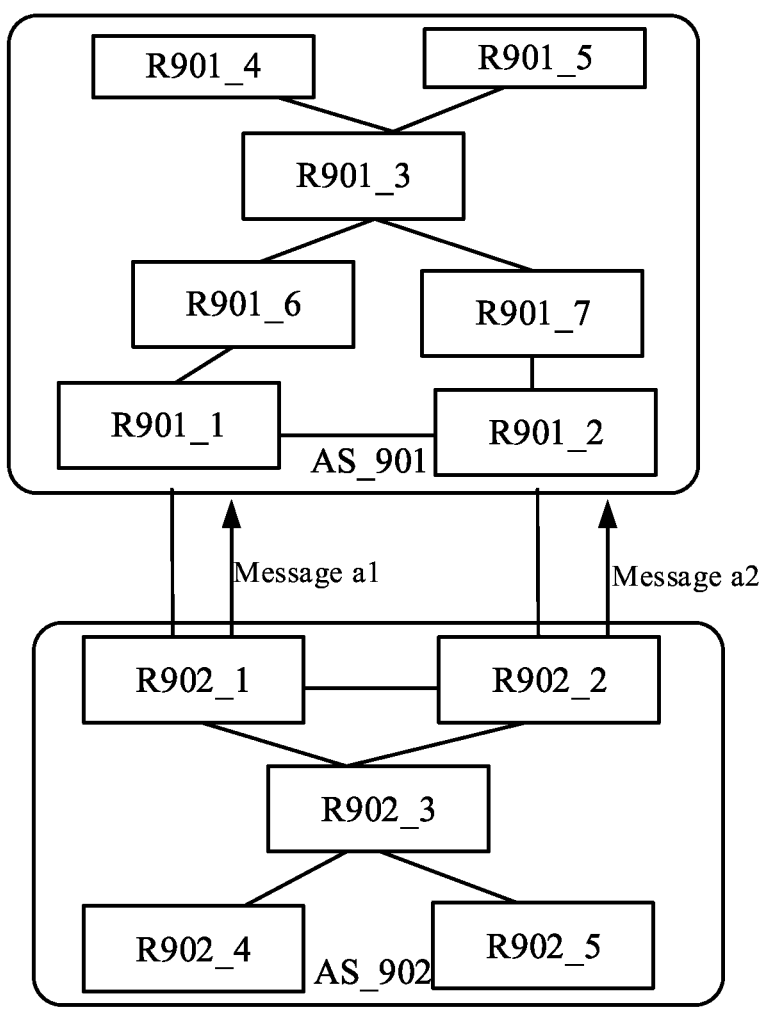
FIG. 9 is a schematic diagram of a network according to an embodiment of the present disclosure.

FIG. 9 is a schematic diagram of a network according to an embodiment of the present disclosure. The network shown in FIG. 9 is described only with two AS s AS_901 and AS_902, which is not limited herein, other cases are similar.

In this embodiment, the BFR ID range in the AS_901 is set to 1-256 (only 1-4 thereof is used in the examples of the present disclosure), and respective BFRs in the AS_901 are configured as in Table 1.

TABLE 1

| R901_1 | R901_2 | R901_3 | R901_4 | R901_5 | R901_6 | R901_7 |
|---|---|---|---|---|---|---|
| SD: 1 | SD: 1 | SD: 1 | SD: 1 | SD: 1 | SD: 1 | SD: 1 |
| BFR ID: 1 | BFR ID: 2 | BFR ID: 0 | BFR ID: 3 | BFR ID: 4 | BFR ID: 0 | BFR ID: 0 |
| BSL: 256 | BSL: 256 | BSL: 256 | BSL: 256 | BSL: 256 | BSL: 256 | BSL: 256 |
| Max SI: 4 | Max SI: 4 | Max SI: 4 | Max SI: 4 | Max SI: 4 | Max SI: 4 | Max SI: 4 |
| BFR-Prefix: 2001:1:1A::1 | BFR-Prefix: 2001:1:1A::2 | BFR-Prefix: 2001:1:1A::3 | BFR-Prefix: 2001:1:1A::4 | BFR-Prefix: 2001:1:1A::5 | BFR-Prefix: 2001:1:1A::6 | BFR-Prefix: 2001:1:1A::7 |

In the network shown in FIG. 9, there are two pairs of ASBRs connected between AS_901 and AS_902, that is, R901_1 serving as ASBR in the AS_901 is connected with R902_1 serving as ASBR in the AS_902, and R901_2 serving as ASBR in the AS_901 is connected with R902_2 serving as ASBR in the AS_902. In FIG. 9, the R901_1 and R901_2 are configured as members of a BFR group_1. The R901_1 and R901_2 are configured with a BFR group prefix (GBFR-Prefix) in a specified SD (taking SD1 as an example), and the GBFR-Prefix is 2001:1:1A::100 representing the BFR group_1. Table 2 exemplifies GBFR-Prefixes configured for the R901_1 and R901_2.

TABLE 2

| R901_1 | R901_2 |
|---|---|
| GBFR-Prefix: 2001:1:1A::100 | GBFR-Prefix: 2001:1:1A::100 |

For BIER notifying between AS_901 and AS_902

In this embodiment, the BFR ID range in the AS_902 is set to 257-512 (only 260-264 thereof is used in the examples of the present disclosure), and respective BFRs in the AS_902 are configured as in Table 3.

TABLE 3

| R902_1 | R902_2 | R902_3 | R902_4 | R902_5 |
|---|---|---|---|---|
| SD: 1 | SD: 1 | SD: 1 | SD: 1 | SD: 1 |
| BFR ID: 262 | BFR ID: 263 | BFR ID: 0 | BFR ID: 260 | BFR ID: 261 |
| BSL: 256 | BSL: 256 | BSL: 256 | BSL: 256 | BSL: 256 |
| Max SI: 4 | Max SI: 4 | Max SI: 4 | Max SI: 4 | Max SI: 4 |
| BFR-Prefix: 2002:2:2F::1 | BFR-Prefix: 2002:2:2F::2 | BFR-Prefix: 2002:2:2F::3 | BFR-Prefix: 2002:2:2F::4 | BFR-Prefix: 2002:2:2F::5 |

In the network shown in FIGS. 9, R902_1 and R902_2 serving as ASBRs in the AS_902 are configured as members of a BFR group_2. The R902_1 and R902_2 are configured with a BFR group prefix (GBFR-Prefix) in a same specified SD (taking SD1 as an example), and the GBFR-Prefix is 2002:2:2F::200 representing the BFR group_2. Table 4 shows GBFR-Prefixes configured for the R902_1 and R902_2.

TABLE 4

| R902_1 | R902_2 |
|---|---|
| GBFR-Prefix: 2002:2:2F::200 | GBFR-Prefix: 2002:2:2F::200 |

For BIER notifying between AS_901 and AS_902

The following descriptions are made below with the BIER information of the AS_902 notified to the AS_901 in this embodiment.

As shown in FIG. 9, in the AS_902, the R902_1 collects BFR IDs in the AS_902 from an IGP or a BIER route management module of the present device. In this embodiment, the collected BFR-IDs mainly include 260, 261, 262 and 263, and the BFR-IDs may be represented with "260, 4" as detailed in Table 5, where "260" represents a start value of a BFR ID segment with continuous values (i.e. 260-264), and "4" represents that the number of BFR IDs is 4 in the BFR ID segment with continuous values (i.e. 260-264).

The R902_1 notifies the network reachability information corresponding to the GBFR-Prefix 2002:2:2F::200 through an EBGP UPDATE message (denoted as message a1). Herein, the message a1 carries NLRI and BIER Path Attribute. Based on the structure of a BGP UPDATE message shown in FIGS. 3-7, the message a1 carries the NLRI and the BIER Path Attribute as shown in Table 5.

TABLE 5

| BIER Path Attribute | Subdomain-ID: 1, BFR-ID: 262 |
|---|---|
| | Max SI: 4 |
| | BS Len: 3 Notes: corresponding length 256 bits |
| | BIFT ID 2000 |
| | BFR-IDs: 260, 4 Notes: corresponding SI 1 |
| | NBR BFR-Prefix: 2002:2:2F::1 |
| NLRI | Prefix: 2002:2:2F::200/128 |

In the Table 5, NBR BFR-prefix: 2002:2:2F::1 is a BFR-Prefix of the R902_1 used as an IPv6 destination address by which a neighbor ASBR receiving the message a1, for example, R901_1, forwards a BIER6 packet to the R902_1.

Similar to R902_1, in the AS_902, the R902_2 may also collect BFR IDs in the AS_902 from the IGP or the BIER route management module of the present device. The collected BFR-IDs are as mentioned above and will not be repeated herein. Afterwards, the R902_2 notifies the network reachability information corresponding to the GBFR-Prefix 2002:2:2F::200 through an EBGP UPDATE message (denoted as message a2). The message a2 carries NLRI and BIER Path Attribute. Based on the structure of a BGP UPDATE message shown in FIGS. 3-7, the message a2 carries the NLRI and the BIER Path Attribute as shown in Table 6.

TABLE 6

| | |
|---|---|
| BIER Path Attribute | Subdomain-ID: 1, BFR-ID: 263<br>Max SI: 4<br>BS Len: 3 Notes: corresponding length 256 bits<br>BIFT ID 2000<br>BFR-IDs: 260, 4 Notes: corresponding SI 1<br>NBR BFR-Prefix: 2002:2:2F::2 |
| NLRI | Prefix: 2002:2:2F::200/128 |

In the Table 6, NBR BFR-Prefix: 2002:2:2F::2 is a BFR-Prefix of the R902_2 used as an IPv6 destiantion address by which a neighbor ASBR receiving the message a2 (R901_2) forwards a BIER6 packet to the R902_2.

When the R901_1 in the AS_901 receives the message a1 and finds that the message a1 carries the BIER Path Attribute, it is considered that a BIER route is received and the forwarding entry shown in Table 7 is added in the BIFT with an BIFT ID being 2001 (corresponding BSL/SD/SI are 3/1/1 respectively).

TABLE 7

| F-BM | BFR-NBR |
|---|---|
| 1111000 | 2002:2:2F::1<br>(BFR-Prefix of R902_1 in SD1) |

In Table 7, the bit in the F-BM is set to 1, which indicates that the BFR corresponding to the BFR ID represented by the bit can be reached via the BFR-NBR in Table 7. On the contrary, the bit in the F-BM is set to 0, which indicates that the BFR corresponding to the BFR ID represented by the bit cannot be reached via the BFR-NBR in Table 7. For example, in Table 7, the F-BM is "1111000", the "1" on the first bit from the right represents that the BFR ID is 260, and the "1" on the second bit represents that the BFR ID is 261 and so on. Furthermore, the R901_1 modifies the NBR BFR-Prefix in the BIER Path Attribute from 2002:2:2F::2 to 2001:1:1A::1, notifies a prefix route of the Group BFR-prefix, i.e. 2002:2:2F::200/128 in the AS_901, and carries the modified BIER Path Attribute (the prefix route may be denoted as BIER route at this time). When receiving the prefix route of 2002:2:2F::200/128 notified by the R901_1, other BFRs in the AS_901 continue to notify the prefix route of 2002:2:2F::200/128 in a manner similar to that the AS_901 notifies a route.

Likewise, when the R901_2 in the AS_901 receives the message a2 and finds the message a2 carries the BIER Path Attribute, it is considered that a BIER route is received and the forwarding entry shown in Table 8 is added in the BIFT with an BIFT ID being 2001 (corresponding BSL/SD/SI are 3/1/1 respectively).

TABLE 8

| F-BM | BFR-NBR |
|---|---|
| 1111000 | 2002:2:2F::2<br>(BFR-Prefix of R902_2 in SD1) |

The F-BM in Table 8 is similar to the one in Table 7 and thus will not be repeated herein. Similarly, the R901_2 also notifies a prefix route of the Group BFR-prefix, i.e. 2002:2:2F::200/128 in the AS_901, and carries the modified BIER Path Attribute. When receiving the prefix route of 2002:2:2F::200/128 notified by the R901_2, other BFRs in the AS_901 continue to notify the prefix route of 2002:2:2F::200/128 in a manner similar to that the AS_902 notifies a route.

When learning two routes of the same prefix 2002:2:2F::200/128 of the AS_902, the BFR in the AS_901 selects one route as an optimal route based on existing route optimization method. For example, as shown in FIG. 9, when learning two routes of the same prefix 2002:2:2F::200/128 of the AS_902, R901_3 selects a route with a next hop being R901_1 as an optimal route based on existing route optimization method, for example, shortest path algorithm and the like. After determining the optimal route, the BFR in the AS_901 may add a forwarding entry corresponding to the optimal route in the BIFT. For example, in FIG. 9, when learning two routes of a same prefix, i.e. 2002:2:2F::200/128, R901_3 selects a route with a next hop being R901_6 as an optimal route. In this case, a forwarding entry is added in the BIFT with a BIFT ID being 2001 as shown in Table 9 (corresponding BSL/SD/SI are 3/1/1 respectively).

TABLE 9

| F-BM | BFR-NBR |
|---|---|
| 1111000 | 2001:1:1A::6<br>(BFR-Prefix of R901_6 in SD1) |

As can be seen from the above embodiments, although there are two pairs of ASBRSs connected between the AS_901 and the AS_902, for any one AS (taking AS_902 as an example), two pieces of NLRI of the UPDATE messages notified by respective ASBRs R902_1 and R902_2 connected with the AS_901 in the AS_902 are same, i.e. a same BFR group prefix. When receiving the UPDATE messages notified by respective ASBRs R902_1 and R902_2 in the AS_902, respective ASBRs R901_1 and R901_2 in the AS_901 may continue to notify the NLRI carried in the UPDATE messages and carry the BIER Path Attributes carried in the UPDATE messages, such that other BFRs in the AS_901 may receive a plurality of routes of same NLRI of the AS_902. When receiving a plurality of routes of same NLRI of the AS_902, the BFR in the AS_901 may select one route as an optimal route based on a route optimization method. In this case, the BFR in the AS_901 may no longer take the network reachability information notified by respective ASBRs in an external AS, i.e. the AS_902 as mutually-independent unicast routes nor perform route calculation independently, but select one route as an optimal route based on a route optimization method, which significantly reduces BIER route calculation complexity and guarantees subsequent packet forwarding.

The above descriptions are made to the embodiments shown in FIG. 9.

Optionally, in this embodiment, the step 803 in which the second ASBR notifies the BIER route corresponding to the NLRI carried in the UPDATE message in the second AS may be implemented in many manners. Two implementations thereof will be described below by way of examples.

The First Implementation

Figure 10:
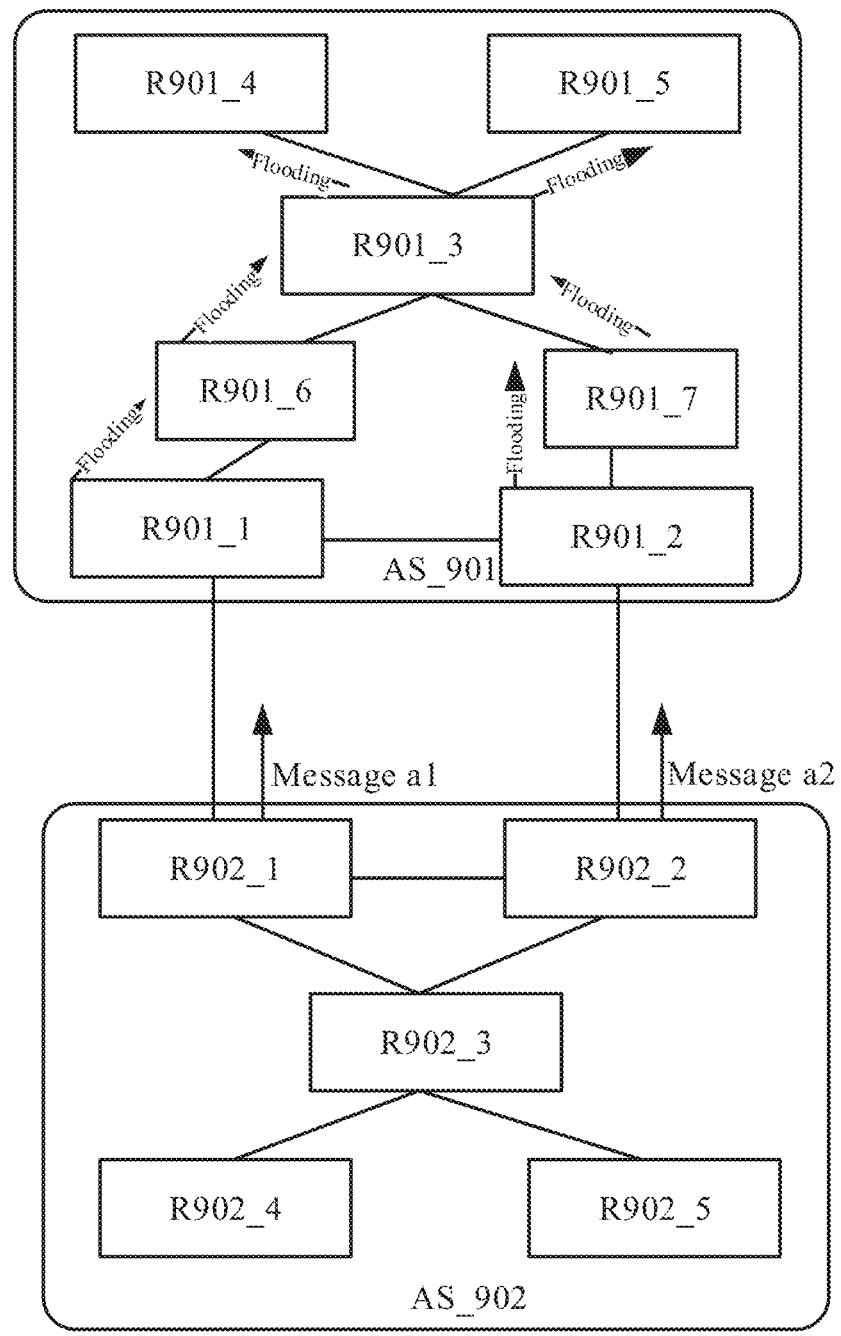
FIG. 10 is a schematic diagram of notifying external AS BIER information based on an Interior Gateway Protocol (IGP) according to an embodiment of the present disclosure.

In the first implementation, the second ASBR re-provides a BIER route of an external AS through an IGP in the second AS. Optionally, in the first implementation, the second ASBR modifies the first BFR prefix in the BIER Path Attribute into a second BFR prefix representing the second ASBR, introduces the NLRI and the modified BIER Path Attribute into the IGP by extending the IGP and performs flooding in the second AS (at this time, the flooding route may be called BIER route for short), such that the BFR in the second AS adds a corresponding BIFT forwarding entry in a local BIFT. Still taking the network shown in FIG. 9 as an example, when receiving the EBGP UPDATE message notified by the R902_1 in the AS_902, the R901_1 in the AS_901 modifies the BFR prefix of the R902_1 in the BIER Path Attribute carried in the EBGP UPDATE message into the BFR prefix of R901_1, and performs flooding for the prefix 2002:2:2F::200/128 carried in the EBGP UPDATE message and the modified BIER Path Attribute through the IGP in the AS_901 by extending the IGP. Likewise, when receiving the EBGP UPDATE message notified by the R902_2 in the AS_902, the R901_2 in the AS_901 also modifies the BFR prefix of the R902_2 in the BIER Path Attribute carried in the EBGP UPDATE message into the BFR prefix of R901_2, and performs flooding for the prefix 2002:2:2F::200/128 carried in the EBGP UPDATE message and the modified BIER Path Attribute through the IGP in the AS_901 by extending the IGP. FIG. 10 exemplifies an embodiment of route flooding corresponding to 2002:2:2F::200/128. In this case, the BFR in the AS_901 may learn two routes of a same prefix 2002:2:2F::200/128 in the AS_902. When learning two routes of the same prefix 2002:2:2F::200/128 in the AS_902, the BFR in the AS_901 selects one route as an optimal route based on existing route optimization method. For example, in FIG. 9, when learning two routes of the same prefix 2002:2:2F::200/128 of the AS_902, the R901_3 selects a route with a next hop being R901_6 as an optimal route based on existing route optimization method, for example, shortest path algorithm and the like, and adds a forwarding entry shown in FIG. 9 in a BIFT with a BIFT ID being 2001 (corresponding BSL/SD/SI are 3/1/1 respectively).

The Second Implementation

Figure 11:
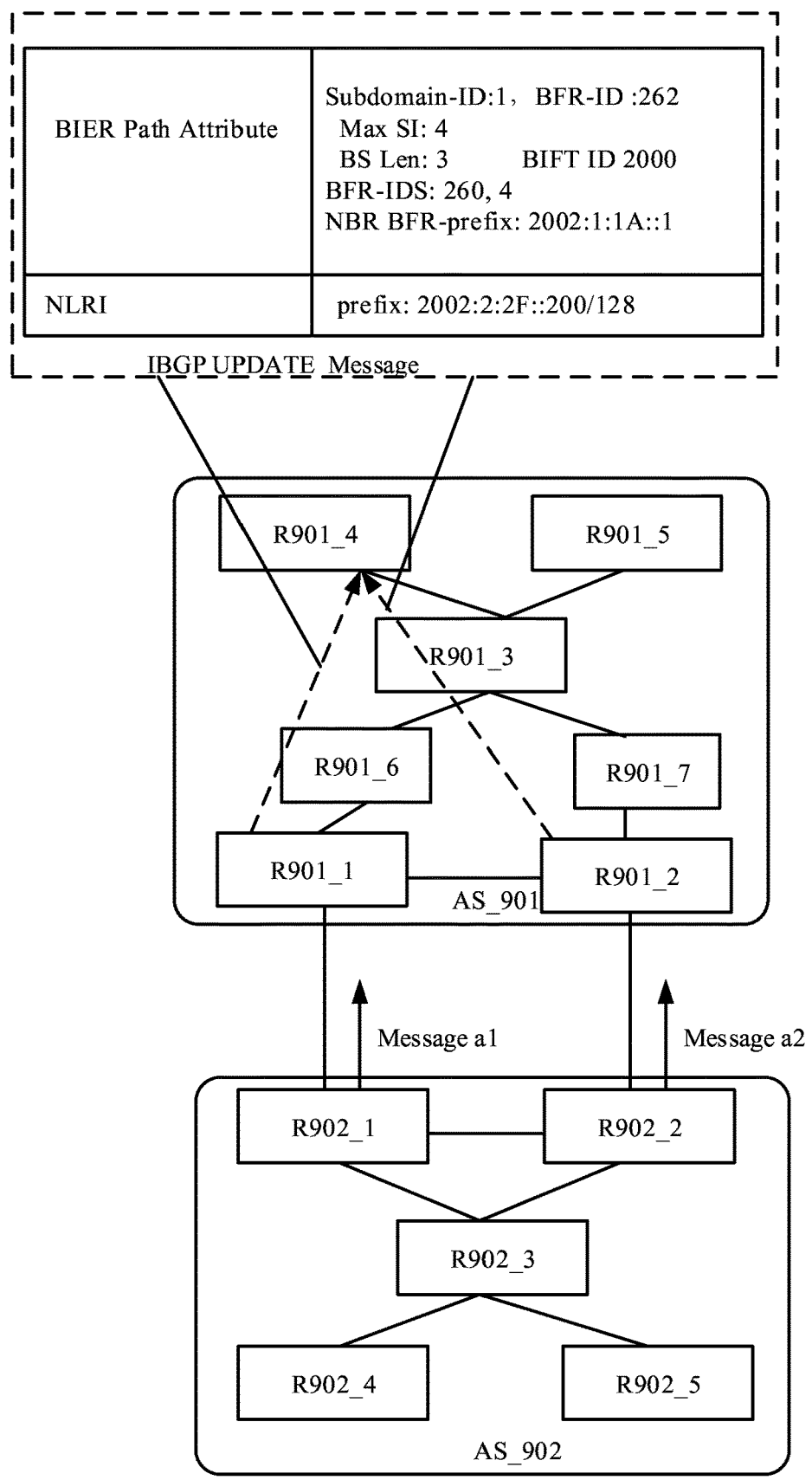
FIG. 11 is a schematic diagram of notifying external AS BIER information based on an Interior Border Gateway Protocol (IBGP) according to an embodiment of the present disclosure.

In the second implementation, the second ASBR notifies a BIER route of the first BFR group prefix in an external AS to a specified BFR through an Interior Border Gateway Protocol (IBGP) in the second AS. Optionally, the second ASBR modifies the first BFR prefix in the BIER Path Attribute into the second BFR prefix representing the second ASBR, and notifies the NLRI and the modified BIER Path Attribute to the specified BFR (equivalent of the second ASBR) by extending the IBGP, that is, by extending an IBGP UPDATE message defined by the IBGP, such that the specified BFR in the second AS adds a corresponding BIFT forwarding entry in a local BIFT. Still taking the network shown in FIG. 9 as an example, when receiving the EBGP UPDATE message notified by the R902_1 in the AS_902, the R901_1 in the AS_901 modifies the BFR prefix of the R902_1 in the BIER Path Attribute carried in the EBGP UPDATE message into the BFR prefix of the R901_1, and notifies the prefix 2002:2:2F::200/128 carried in the EBGP UPDATE message and the modified BIER Path Attribute to a specified BFR in the AS_901 (pre-specified, taking R901_4 shown in FIG. 9 as an example) through an IBGP UPDATE message by extending the IBGP. Likewise, when receiving the EBGP UPDATE message notified by the R902_2 in the AS_902, the R901_2 in the AS_901 modifies the BFR prefix of the R902_2 in the BIER Path Attribute carried in the EBGP UPDATE message into the BFR prefix of the R901_2, and notifies the prefix 2002:2:2F::200/128 carried in the EBGP UPDATE message and the modified BIER Path Attribute to a specified BFR in the AS_901 (pre-specified, taking R901_4 shown in FIG. 9 as an example) through an IBGP UPDATE message by extending the IBGP. FIG. 11 exemplifies an embodiment of notifying of an IBGP UPDATE message. When receiving the IBGP UPDATE message notified by the R901_1 and the R901_2, the R901_4 learns two routes of the same prefix 2002:2:2F::200/128 of the AS_902 and selects one route as an optimal route, for example, selects a route with a next hop being R901_1 as an optimal route based on shortest path algorithm and the like, and then adds a forwarding entry in a BIFT with a BIFT ID being 2001 (corresponding BSL/SD/SI are 3/1/1 respectively) as detailed in Table 10.

TABLE 10

| F-BM | BFR-NBR |
|---|---|
| 1111000 | 2001:1:1A::1 (BFR-Prefix of R901_1 in SD1) |

The above descriptions are made to the method of the embodiments of the present disclosure. The following descriptions are made to an apparatus of the embodiments of the present disclosure.

Figure 12:
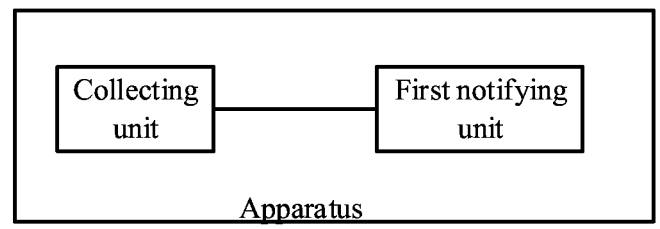
FIG. 12 is a structural diagram of an apparatus according to an embodiment of the present disclosure.

FIG. 12 is a structural diagram of an apparatus according to an embodiment of the present disclosure. The apparatus is applied to a first AS. Corresponding to the flow shown in FIG. 2, the apparatus includes:

a collecting unit, configured to collect BFR IDs of respective BFRs in the first AS; and a first notifying unit, configured to notify a route UPDATE message to a second AS, where the UPDATE message carries NLRI and BIER Path Attribute; the NLRI at least includes a first BFR group prefix; the BIER Path Attribute at least includes the collected BFR IDs and a first BFR prefix representing a first ASBR, such that at least one ASBR receiving the UPDATE message in the second AS adds a corresponding BIFT forwarding entry in a BIFT and notifies a BIER route corresponding to the first BFR group prefix in the second AS.

The BIFT forwarding entry at least includes a BFR neighbor and an F-BM. The BFR neighbor is indicated by the first BFR prefix, the F-BM represents BFR IDs corresponding to respective BFRs reachable via the BFR neighbor, and the BFR IDs represented by the F-BM at least include BFR IDs collected by the first ASBR in the first AS.

As an embodiment, the BFRs corresponding to the collected BFR IDs are located in a specified SD; and/or, respective ASBRs receiving the UPDATE message in the second AS are also located in the specified SD.

As an embodiment, the collecting unit collects the BFR IDs of respective BFRs in the first AS, which includes:

collecting a BFR ID of a BFR deployed as BFIR in the first AS; and collecting a BFR ID of a BFR deployed as BFER in the first AS.

As an embodiment, the BIER Path Attribute carries a first TLV; the first TLV at least includes at least one field pair, and each field pair includes a BFR ID field and a BFR ID range field which are in corresponding relationship.

The first TLV carries the BFR IDs collected by the first ASBR in the first AS through at least one field pair. In each field pair, a parameter carried in the BFR ID Range field represents a BFR ID segment with continuous values, and the BFR ID field carries a start BFR ID of the BFR ID segment.

As an embodiment, the BIER Path Attribute carries a second TLV; the second TLV at least includes a BFR-Prefix field; the BFR-Prefix field carries the first BFR prefix.

As an embodiment, the BIER Path Attribute further carries a third TLV; a type field in the third TLV is used to carry a BIER encapsulation type supported by the first ASBR.

The third TLV further includes a BIER encapsulation information field which is used to carry BIER encapsulation information supported by the first ASBR. Herein, the BIER encapsulation information is used to determine an entry identifier of a BIFT forwarding entry. As an embodiment, the BIER encapsulation information at least includes:

MAX SI, which represents an SI corresponding to a maximum BFR ID in the first AS;

BSL, which represents a bit string length in a supported BIER encapsulation;

BIFT ID, which represents an identifier of a local BIFT.

As an embodiment, the BIER Path Attribute further carries an SD configuration field.

The SD configuration field carries SD configuration information which at least includes the specified SD and the BFR ID of the first ASBR.

Thus, the structural diagram of the apparatus shown in FIG. 12 is completed.

Figure 13:
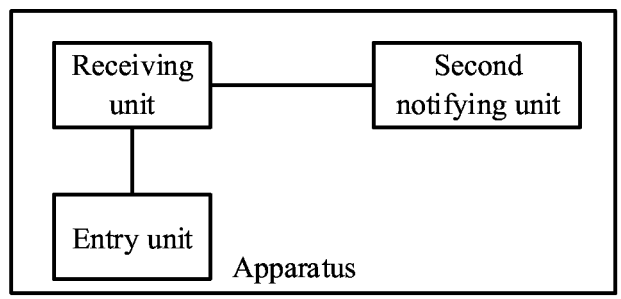
FIG. 13 is a structural diagram of another apparatus according to an embodiment of the present disclosure.

FIG. 13 is a structural diagram of another apparatus according to an embodiment of the present disclosure. The apparatus is applied to a second ASBR in a second AS. The apparatus corresponds to the flow shown in FIG. 8.

As shown in FIG. 8, the apparatus includes:

a receiving unit, configured to receive an UPDATE message notified by a first ASBR in a first AS, where the UPDATE message at least carries NLRI and a newly-added BIER Path Attribute, the NLRI is a first BFR group prefix, and members in a first BFR group corresponding to the first BFR group prefix include the first ASBR and at least one other ASBR connected with the second AS in the first AS;

an entry unit, configured to add a corresponding BIFT forwarding entry in a BIFT, where the BIFT forwarding entry at least includes a BFR neighbor and an F-BM, the BFR neighbor is indicated by a first BFR prefix, the F-BM represents BFR IDs corresponding to respective BFRs reachable via the BFR neighbor, and the BFR IDs represented by the F-BM at least include BFR IDs collected by the first ASBR in the first AS and carried in the BIER Path Attribute;

a second notifying unit, configured to notify a BIER route corresponding to the first BFR group prefix in the second AS, such that the BFR in the second AS selects one of a plurality of BIER routes corresponding to the first BFR group prefix as an optimal route based on a route optimization method when receiving the plurality of BIER routes corresponding to the first BFR group prefix.

Optionally, the second advertising unit notifies the BIER route corresponding to the NLRI carried in the UPDATE message in the second AS, which includes:

modifying the first BFR prefix in the BIER Path Attribute into a second BFR prefix representing a second ASBR; re-providing the BIER route corresponding to the first BFR group prefix through an IGP in the second AS, or, notifying the BIER route corresponding to the first BFR group prefix to a specified BFR in the second AS through an IBGP; where the BIER route carries the NLRI and the modified BIER Path Attribute.

Figure 14:
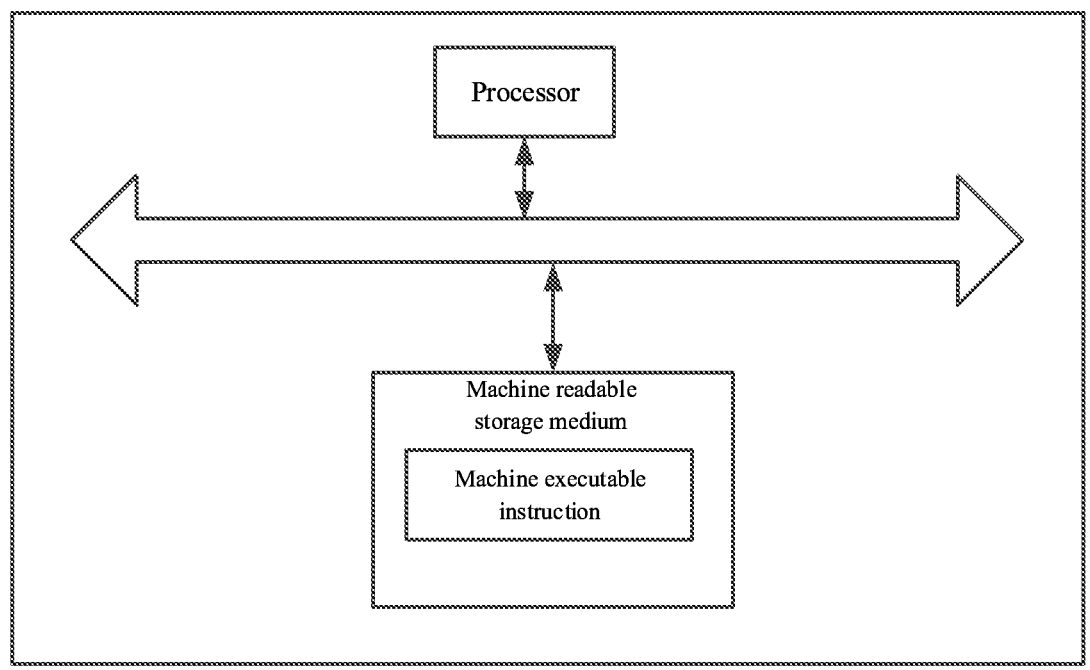
FIG. 14 is a hardware structure diagram of an apparatus according to an embodiment of the present disclosure.

An embodiment of the present disclosure further provides a hardware structure of the apparatus shown in the above FIG. 12 or 13. FIG. 14 is a structural diagram of an electronic device according to an embodiment of the present disclosure. As shown in FIG. 14, the hardware structure may include: a processor and a machine readable storage medium. The machine readable storage medium stores machine executable instructions executable by the processor; and the processor is configured to execute the machine executable instructions to implement the method according to the above embodiments of the present disclosure.

Based on the same idea as the above method, an embodiment of the present disclosure further provides a machine readable storage medium storing several computer instructions, where the computer instructions are executed by a processor to implement the method according to the above embodiments of the present disclosure.

Illustratively, the machine readable storage medium mentioned herein may be any of electronic, magnetic, optical or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

The systems, apparatuses, modules or units described in the above embodiments may be specifically implemented by a computer chip or an entity or may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For ease of descriptions, the above apparatuses are divided into different units based on functionality for descriptions. Of course, the functions of different units may be implemented in a same or a plurality of hardware and/or software when practicing the present disclosure.

The persons skilled in the art should understand that the embodiments of the present disclosure may be provided as a method, a system, or a computer program product. Thus, entire hardware embodiments, entire software embodiments or embodiments combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in an embodiment of the present disclosure. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing devices, so that a series of operation steps can be executed on the computer or another programmable device to generate processing achieved by the computer, and thus instructions executable on the computer or another programmable device are provided for steps for realizing functions designated in one or more flows of the flowcharts and/or one or more blocks of the block diagrams.

The foregoing descriptions are only embodiments of the present disclosure but not intended to limit the present disclosure. For the persons skilled in the art, various modifications and changes may be made to the present disclosure. Any modifications, equivalent substitutions, and improvements made within the spirit and principles of the disclosure shall be encompassed in the scope of protection of the present disclosure.

The foregoing disclosure is merely illustrative of preferred embodiments of the present disclosure but not intended to limit the present disclosure, and any modifications, equivalent substitutions, adaptations thereof made within the spirit and principles of one or more embodiments in the present disclosure shall be encompassed in the scope of protection of the present disclosure.

The invention claimed is:

1. A route notifying method, the method being performed by a first autonomous system border router (ASBR) in a first autonomous system (AS), wherein the first ASBR and at least one other ASBR in the first AS are connected with a second AS, the first ASBR and the at least one other ASBR are members of a first Bit Forwarding Router (BFR) group, the first ASBR and the at least one other ASBR are configured with a first BFR group prefix in a specified sub-domain (SD), and the first BFR group prefix represents the first BFR group; the method comprises:
collecting BFR identifiers (IDs) of respective BFRs in the first AS; and
notifying a route UPDATE message to the second AS, wherein the UPDATE message carries network layer reachability information (NLRI) and a Bit Index Explicit Replication (BIER) Path Attribute; the NLRI at least comprises the first BFR group prefix; the BIER Path Attribute at least comprises the collected BFR IDs and a first BFR prefix representing the first ASBR such that at least one ASBR receiving the UPDATE message in the second AS adds a corresponding Bit Index Forwarding Table (BIFT) forwarding entry in a BIFT and notifies a BIER route corresponding to the first BFR group prefix in the second AS; the BIFT forwarding entry at least comprises: a BFR neighbor and a forwarding bit mask (F-BM), the BFR neighbor is indicated by the first BFR prefix, the F-BM at least represents BFR IDs corresponding to respective BFRs reachable via the BFR neighbor, and the BFR IDs represented by the F-BM at least comprise the BFR IDs collected by the first ASBR in the first AS.

2. The method according to claim 1, wherein the BFRs corresponding to the collected BFR IDs are located in the specified SD; and/or,
respective ASBRs receiving the UPDATE message in the second AS are also located in the specified SD.

3. The method according to claim 1, wherein collecting the BFR IDs of respective BFRs in the first AS comprises:
collecting a BFR ID of a BFR deployed as a bit forwarding ingress router (BFIR) in the first AS; and,
collecting a BFR ID of a BFR deployed as a bit forwarding egress router (BFER) in the first AS.

4. The method according to claim 1, wherein the BIER Path Attribute carries a first TLV; the first TLV at least comprises at least one field pair, and each field pair comprises a BFR ID field and a BFR ID range field which are in corresponding relationship;
the first TLV carries the BFR IDs collected by the first ASBR in the first AS through at least one field pair; wherein in each field pair, a parameter carried in the BFR ID Range field represents a BFR ID segment with continuous values, and the BFR ID field carries a start BFR ID of the BFR ID segment.

5. The method according to claim 1, wherein the BIER Path Attribute carries a second TLV; the second TLV at least comprises a BFR-Prefix field;
the BFR-Prefix field carries the first BFR prefix.

6. The method according to claim 1, wherein the BIER Path Attribute further carries a third TLV;
a type field in the third TLV is used to carry a BIER encapsulation type supported by the first ASBR;
the third TLV further comprises a BIER encapsulation information field which is used to carry BIER encapsulation information supported by the first ASBR; and the BIER encapsulation information is used to determine an entry identifier of the BIFT forwarding entry.

7. The method according to claim 1, wherein the BIER Path Attribute further carries an SD configuration field;
the SD configuration field carries SD configuration information which at least comprises the specified SD and the BFR ID of the first ASBR.

8. A route notifying method, the method being performed by a second autonomous system border router (ASBR) in a second autonomous system (AS), wherein the second ASBR is connected with a first ASBR in a first AS, at least one other ASRB than the second ASBR in the second AS is also connected with the first AS, the second ASBR and the at least one other ASBR are members of a second Bit Forwarding Router (BFR) group, the second ASBR and the at least one other ASBR are configured with a second BFR group prefix in a specified sub-domain (SD), and the second BFR group prefix represents the second BFR group; the method comprises:
receiving a route UPDATE message notified by the first ASBR in the first AS, wherein the UPDATE message at least carries network layer reachability information (NLRI) and a newly-added Bit Index Explicit Replication (BIER) Path Attribute, the NLRI is a first BFR group prefix, members in a first BFR group corresponding to the first BFR group prefix comprise the first ASBR and at least one other ASBR connected with the second AS in the first AS;

adding a corresponding Bit Index Forwarding Table (BIFT) forwarding entry in a BIFT, wherein the BIFT forwarding entry at least comprises a BFR neighbor and a forwarding bit mask (F-BM), the BFR neighbor is indicated by the first BFR prefix, the F-BM represents BFR IDs corresponding to respective BFRs reachable via the BFR neighbor, and the BFR IDs represented by the F-BM at least comprise the BFR IDs collected by the first ASBR in the first AS and carried in the BIER Path Attribute; and notifying a BIER route corresponding to the first BFR group prefix in the second AS, such that the BFR in the second AS selects one of a plurality of BIER routes corresponding to the first BFR group prefix as an optimal route based on a route optimization method when receiving the plurality of BIER routes corresponding to the first BFR group prefix.

9. The method according to claim 8, wherein notifying the BIER route corresponding to the NLRI carried in the UPDATE message in the second AS comprises:

modifying the first BFR prefix in the BIER Path Attribute into a second BFR prefix representing the second ASBR; and re-providing the BIER route corresponding to the first BFR group prefix through an Interior Gateway Protocol (IGP) in the second AS, or, notifying the BIER route corresponding to the first BFR group prefix to a specified BFR in the second AS through an Interior Border Gateway Protocol (IBGP); wherein the BIER route carries the NLRI and the modified BIER Path Attribute.

10. An electronic device, comprising a processor and a machine readable storage medium; wherein the machine readable storage medium stores machine executable instructions executable by the processor;

the processor is configured to execute the machine executable instructions to implement a route notifying method, the method being performed by a first autonomous system border router (ASBR) in a first autonomous system (AS), wherein the first ASBR and at least one other ASBR in the first AS are connected with a second AS, the first ASBR and the at least one other ASBR are members of a first Bit Forwarding Router (BFR) group, the first ASBR and the at least one other ASBR are configured with a first BFR group prefix in a specified sub-domain (SD), and the first BFR group prefix represents the first BFR group; the method comprises:

collecting BFR identifiers (IDs) of respective BFRs in the first AS; and notifying a route UPDATE message to the second AS, wherein the UPDATE message carries network layer reachability information (NLRI) and a Bit Index Explicit Replication (BIER) Path Attribute; the NLRI at least comprises the first BFR group prefix; the BIER Path Attribute at least comprises the collected BFR IDs and a first BFR prefix representing the first ASBR such that at least one ASBR receiving the UPDATE message in the second AS adds a corresponding Bit Index Forwarding Table (BIFT) forwarding entry in a BIFT and notifies a BIER route corresponding to the first BFR group prefix in the second AS; the BIFT forwarding entry at least comprises: a BFR neighbor and a forwarding bit mask (F-BM), the BFR neighbor is indicated by the first BFR prefix, the F-BM at least represents BFR IDs corresponding to respective BFRs reachable via the BFR neighbor, and the BFR IDs represented by the F-BM at least comprise the BFR IDs collected by the first ASBR in the first AS.

11. The electronic device according to claim 10, wherein the BFRs corresponding to the collected BFR IDs are located in the specified SD; and/or, respective ASBRs receiving the UPDATE message in the second AS are also located in the specified SD.

12. The electronic device according to claim 10, wherein when collecting the BFR IDs of respective BFRs in the first AS, the processor is configured to execute the machine executable instructions to:

collect a BFR ID of a BFR deployed as a bit forwarding ingress router (BFIR) in the first AS; and, collect a BFR ID of a BFR deployed as a bit forwarding egress router (BFER) in the first AS.

13. The electronic device according to claim 10, wherein the BIER Path Attribute carries a first TLV; the first TLV at least comprises at least one field pair, and each field pair comprises a BFR ID field and a BFR ID range field which are in corresponding relationship;

the first TLV carries the BFR IDs collected by the first ASBR in the first AS through at least one field pair; wherein in each field pair, a parameter carried in the BFR ID Range field represents a BFR ID segment with continuous values, and the BFR ID field carries a start BFR ID of the BFR ID segment.

14. The electronic device according to claim 10, wherein the BIER Path Attribute carries a second TLV; the second TLV at least comprises a BFR-Prefix field;

the BFR-Prefix field carries the first BFR prefix.

15. The electronic device according to claim 10, wherein the BIER Path Attribute further carries a third TLV;

a type field in the third TLV is used to carry a BIER encapsulation type supported by the first ASBR;

the third TLV further comprises a BIER encapsulation information field which is used to carry BIER encapsulation information supported by the first ASBR; and the BIER encapsulation information is used to determine an entry identifier of the BIFT forwarding entry.

16. The electronic device according to claim 10, wherein the BIER Path Attribute further carries an SD configuration field;

the SD configuration field carries SD configuration information which at least comprises the specified SD and the BFR ID of the first ASBR.

17. An electronic device, comprising a processor and a machine readable storage medium; wherein the machine readable storage medium stores machine executable instructions executable by the processor;

the processor is configured to execute the machine executable instructions to implement the method according to claim 8.

18. The electronic device according to claim 17, wherein when notifying the BIER route corresponding to the NLRI carried in the UPDATE message in the second AS, the processor is configured to execute the machine executable instructions to:

modify the first BFR prefix in the BIER Path Attribute into a second BFR prefix representing the second ASBR; and re-provide the BIER route corresponding to the first BFR group prefix through an Interior Gateway Protocol (IGP) in the second AS, or, notifying the BIER route corresponding to the first BFR group prefix to a specified BFR in the second AS through an Interior Border Gateway Protocol (IBGP); wherein the BIER route carries the NLRI and the modified BIER Path Attribute.

19. A non-transitory machine readable storage medium storing several computer instructions, where the computer instructions are executed by a processor to implement the method according to claim 1.

20. A non-transitory machine readable storage medium storing several computer instructions, where the computer instructions are executed by a processor to implement the method according to claim 8.

* * * * *